United States Patent [19]
Smith et al.

[11] Patent Number: 5,784,395
[45] Date of Patent: Jul. 21, 1998

[54] DARK PULSE GENERATION

[75] Inventors: Kevin Smith, Ipswich; Daniel Moutinho Pataca; Monica De Lacerda Rocha, both of Woodbridge, all of Great Britain

[73] Assignee: British Telecommunications public limited company, London, England

[21] Appl. No.: 776,790

[22] PCT Filed: Aug. 22, 1995

[86] PCT No.: PCT/GB95/01996

§ 371 Date: Feb. 11, 1997

§ 102(e) Date: Feb. 11, 1997

[87] PCT Pub. No.: WO96/06471

PCT Pub. Date: Feb. 29, 1996

[30] Foreign Application Priority Data

Aug. 23, 1994 [EP] European Pat. Off. ............ 94306208.3

[51] Int. Cl.⁶ ..................................... H01S 3/10
[52] U.S. Cl. ..................... 372/26; 372/18; 372/25
[58] Field of Search ..................... 372/18, 25, 26

[56] References Cited

U.S. PATENT DOCUMENTS 4,036,554  7/1977  Bennett et al. ............... 350/160 R
5,508,845  4/1996  Frisken .......................... 359/161

OTHER PUBLICATIONS

Zhao et al. "Generation of Dark Solitons Under a CW Background Using Waveguide Electro–Optic Modulator", Optics Letters, vol. 15, No. 8, 15 Apr. 1990, New York US, pp. 405–407.

Greer et al. "All–Optical FM Mode–locking of Fibre Laser", Electronics Letters, vol. 28, No. 18, 27 Aug. 1992, Engage GB, pp. 1741–1743, XP 000309486.

Pataca et al. "Actively Modelocked Pr3+–Doped Fluride Fibre Laser", Electronics Letters, vol. 30, No. 12, 9 Jun. 1994, Engage GB, pp. 964–965, XP 000459784.

Pataca et al. "Bright and Dark Pulse Generation in an Optically Modelocked Fibre Laser at 1.3μm", Electronics Letters, vol. 31, No. 1, 5 Jan. 1995 Stevenage, GB, pp. 35–36.

Peter et al. "570 fs Pulses for a Pr3+ Doped Fibre Laser Modelocked by Pump Pulse Induced Cross–Phase Modulation", Electronics Letters, vol. 30, No. 19, 15 Sep. 1994, Stevenage GB, pp. 1595–1596, SP 000466461.

*Primary Examiner*—Rodney B. Bovernick
*Assistant Examiner*—Robert E. Wise
*Attorney, Agent, or Firm*—Nixon & Vanderhye P.C.

[57] ABSTRACT

An optical pulse generator comprises a resonant source of optical radiation, a modulator, and a source of modulating signals, wherein the modulator is operative to mode lock the resonant source and phase modulate the optical radiation in accordance with the modulating signals in such a manner as to produce dark pulses in the optical radiation.

17 Claims, 5 Drawing Sheets

FM MODE - LOCKED LASER
CONVENTIONAL FM MODE - LOCKING

PHASE MODULATOR

CHIRP $\delta\omega \propto -\dfrac{d\emptyset}{dt}$

NORMAL DISPERSION
BROAD UNSTABLE    SHORT, COMPRESSED 

DARK PULSE GENERATION

FIELD OF THE INVENTION

This invention relates to an optical pulse generator for generating dark pulses such as dark soliton pulses.

BACKGROUND

An optical pulse is usually considered to comprise a burst of optical carrier radiation with a given modulation envelope shape. When the pulse has a particular initial envelope shape e.g. U(t)–N sech(t), where N is an integer, the pulse can be transmitted as a soliton in an optical fibre. For such particular envelope shapes, the wavelength dispersion produced in the pulse by the fibre, or so-called chirp, is counterbalanced by the fibre's non-linear dependence of refractive index on amplitude, which produces a self phase modulation (SPM by which the phase of the pulse is modulated by its own intensity. This counterbalance results in a self maintaining pulse or soliton, which tends to maintain its envelope shape with time as it is transmitted along the fibre. The non dispersive nature of solitons makes them attractive for data transmission through optical fibres over long distances.

A pulse having the characteristics just described is known as a bright pulse. It is also possible to generate so called dark pulses such as dark solitons, which occur when an essentially continuous burst of optical radiation contains temporal gaps or regions of reduced intensity radiation. Such gaps are known as dark pulses. It can be shown that for the particular case of solitons, dark solitons may have a general envelope shape given by U(t)–N tanh(t), where N is an integer. For a fuller discussion, reference is directed to Nonlinear propagation effect in optical fibres: numerical studies—K. J. Blow & N. J. Doran Chapter 4, Optical Solitons—Theory and Experiment, edited by J. R. Taylor, Cambrigde University Press 1992.

As used herein, the term dark pulse includes both a black pulse in which the intensity drops to zero a grey pulse in which the intensity drops only partially towards zero.

· Dark solitons have been produce experimentally for example as described on pages 394–396 of "Optical Solitons-Theory Experiment" Supra. In this arrangement, pulses from a dye laser have their frequency components spatially dispersed by means of a grating and then individually weighted by means of a mask. The resultant weighted amplitude components are then recombined by another grating. The pulse is accordingly imparted with a desired temporal profile according to a fourier transform of the desired pulse shape. Using this technique, dark pulses closely resembling the expected black and grey solitons have been generated.

However, a problem with this prior arrangement is that the fourier transform performed by mask and grating is not readily controllable.

The use of a modulator, responsive to input modulating signals, to produce bright solitons is described in D. M. Pataca et al: "Actively Mode-locked $Pr^{3+}$-doped fluoride fibre laser" Electronics Letters 9th Jun. 1994, Vol. 30, No. 12, pp. 964–5. In this arrangement, the praseodymium ($Pr^{3+}$)-doped fibre is included in a resonant cavity pumped by a Nd:YAG pump laser. The cavity is defined by a semi-reflective mirror at one end of the fibre and a filly reflective mirror at the other. The cavity also includes a electro-optical modulator. In use, the modulator is driven by a sinusoidal waveform which produces positive and negative sinusoidal variations in the refractive index of the modulator, so as to phase modulate light resonating in the cavity. If the period of the modulation is selected to correspond to the transit time for light resonating in the cavity, the cavity is said to be mode-locked. The sinusoidal phase modulation produced by the modulator causes positive and negative going chirp for successive half cycles of the modulation frequency. When the resulting chirp is negative going, it compensates for the dispersive characteristics of the $Pr^{3+}$ fibre so that bright solitons are produced during successive negative half cycles of the modulating waveform. For the other half cycles, the positive going chirp that is produced, adds to the dispersion produced by the fibre and as a result, broad unstable pulses are produced.

Reference is also directed to E. J. Green and K. Smith, Electronics Letters, Vol. 28, no. 18, 27 Aug. 1992, pp 1741–1743 in which another mode locked laser configuration is described, which may produce bright solitons.

Dark solitons have been produced using an electro-optical modulator, but without using a mode locking technique, as described by W. Zhao et al, Optics Letters, Vol. 5, no. 8, 15 Apr. 1990, pp 405–407.

SUMMARY OF THE INVENTION

The present invention provides an improved way of producing dark pulses.

Broadly stated, the present invention provides an optical pulse generator comprising the source of optical radiation, a modulator, and a source of modulating signals, the modulator being operative to phase modulate the optical radiation in accordance with the modulating signals in such a manner as to produce dark pulses in the optical radiation.

The radiation source may comprise a laser that is modelocked by He modulator. More particularly, the optical pulse generator according to the invention may comprise an optical cavity, an optically dispersive medium in the cavity, means for producing optical resonance within the cavity, and a modulator for cyclically phase modulating optical signals in the cavity for mode locking the resonance to produce pulses of a given periodicity, wherein the dispersive characteristics of the cavity and the phase modulating characteristics of the modulator are selected to produce dark output pulses.

The optically dispersive medium within the cavity may comprise an optical waveguide, for example an optical fibre doped to provide a particular wavelength dispersion characteristic.

Whilst the generator according to the invention generates dark pulses, it can also be configured to produce bright pulses and, to this end the cavity may also include dispersive means having a predetermined wavelength dispersion characteristic so that radiation resonant in the cavity is subject to wavelength dispersion as a function of the dispersion characteristics of both the waveguide and the dispersive means.

The dispersive means may comprise grating with graticules that have a spatial frequency which varies along the length thereof.

The modulator may comprise an optical modulator, for example an optical fibre connected in the cavity, with an optical modularing source for directing optical modulating pulses into the fibre to modulate its optical characteristics. In this way, phase modulation, which produces mode locking, can be achieved.

BRIEF DESCRIPTION OF THE DRAWINGS

In order that the invention may be more fully understood an embodiment thereof will now be described by way of example with reference to accompanying drawings in which.

DESCRIPTION OF THE EMBODIMENTS

Figure 1:
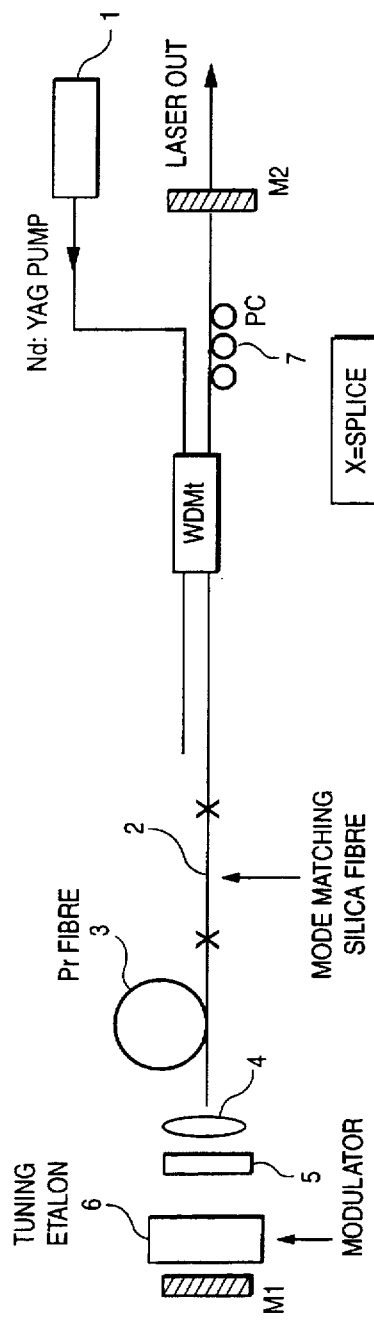
FIG. 1 is schematic illustration of a prior $Pr^{3+}$-doped fluoride fibre laser capable of generating bright pulses.

Referring now to FIG. 1, this shows a prior art phase locked $Pr^{3+}$-doped fluoride fibre laser as proposed by D. M. Pataca et al, Electronic letters Jun. 1994, Vol. 30, No. 12 P.964 supra. The laser consists of a cavity between a fully reflective mirror M1 and a partially reflective mirror M2.

Optical excitation is provided by a mode locked Nd:YAG laser 1 operating in the long wavelength wing of the $Pr^{3+}$ ion absorption (0.32 dB/m absorption @1.064 μm). The pumping energy is coupled through a wavelength division multiplexer WDM1 and a mode matching silica fibre 2 into a $Pr^{3+}$-doped fibre 3. Because the upper state life time of the $Pr^{3+}$ ion is long (~100 μs) compared to the pumping period (~10 ms), the excitation is essentially continuous.

Light leaving the $Pr^{3+}$ fibre is collimated by a lens 4 and directed to a 0.25 mm thick glass runing etalon 5, and thence to a modulator 6. In addition, the cavity includes a set of mechanical polarisation control disks 7.

The modulator 6 is operative to achieve FM mode locking by phase modulating the laser emission of the $Pr^{3+}$ fibre within the cavity. The modulator 6 was operated with a periodicity corresponding to the transit time within the cavity between the mirrors (M1, M2) and as a result, the laser produced output pluses, through the mirror M2, at a rate corresponding to the frequency of the modulator or sub-multiples thereof.

The modulator 6 comprises a bulk lithium niobate electro-optic phase modulator, the peak phase shift of which is a few tenths of 2 radian, and the frequency of which (~420 MHz) was thus tuned to a harmonic of the cavity mode spacing (~10 MHz).

Thus, the laser produced bright pulse, mode locked at the modulation frequency of the modulator 6, at the lasing wavelength of 1.3 μm associated with the $Pr^{3+}$ fibre 3. Further details of the experimental results are given in DM.

Pataca et al, supra. The bright output pulses consisted of a succession of short bright pulses, interleaved with broad unstable pulses, when the modulator was driven by a sinusoidal electrical signal. The reason for this will now be explained with reference to FIG. 2.

Figure 2A:
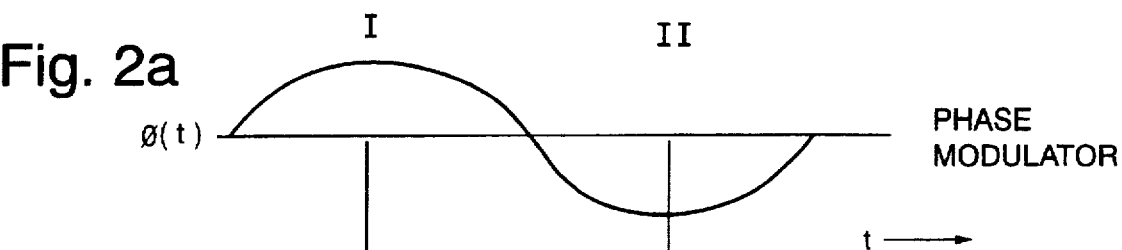
FIG. 2a illustrates the phase modulation produced by the modulator shown in FIG. 1.
Figure 2B:
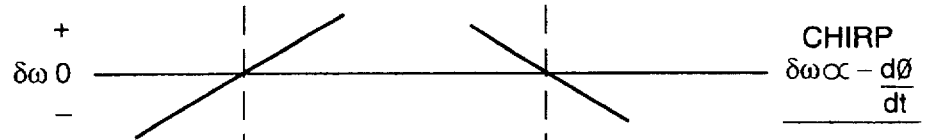
FIG. 2b illustrates the phase and chirp characteristics produced by the modulator in FIG. 2a, FIG. 2c illustrates the resulting output pulses for the successive half cycles of phase modulation produced by the apparatus of FIG. 1.

In FIG. 2a, the drive signal to the phase modulator 6 comprises a conventional sinusoidal electrical waveform This produces a corresponding sinusoidal phase modulation of the light $\emptyset(t)$ in the cavity of the laser which, as shown in FIG. 2b, in region 1, produces a positive going rate of change of frequency or chirp in the FM mode locked pulses. This resultant positive going chirp combines with the positive dispersion of the $Pr^{3+}$ fibre 3 so as to produce a pulse spreading effect which results in a broad, relatively unstable bright output pulse, shown in FIG. 2c.

Figure 3:
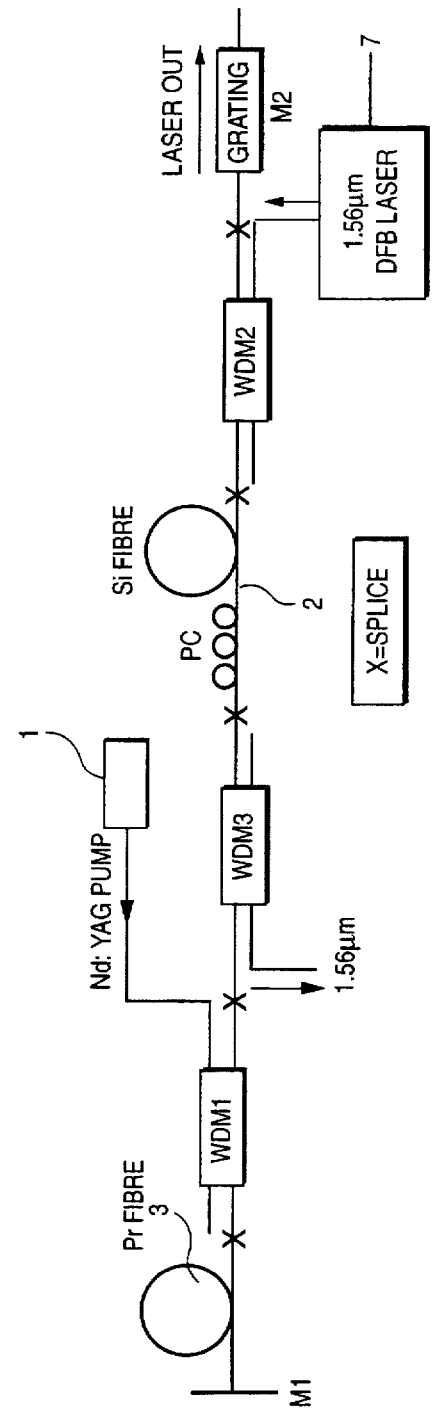
FIG. 3 illustrates an embodiment according to the invention.
Figure 2C:
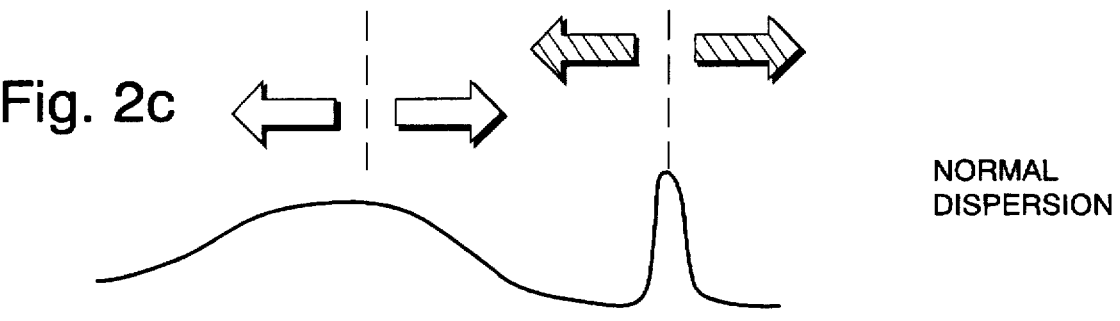

In contrast, for the negative going half cycle of the phase modulation shown in region II. for FIG. 2a, a negative going chirp is produced which combines with the positive dispersion of the $Pr^{3+}$ fibre 3 so as to produce a relatively short duration compressed pulse, 2s shown in FIG. 2c In accordance with the invention, it has been appreciated that the effect shown in region 1 of FIG. 2 can be modified in order to achieve dark output pulses and an embodiment of pulse generator in accordance with the invention will now be described with reference to FIG. 3.

In FIG. 3, a $Pr^{3+}$ doped fibre laser is shown, which instead of being mode locked by a electro-optical modulator as in FIG. 1, is FM mode locked by an optical modulator. As in FIG. 1, the $Pr^{3+}$ fibre 3 is coupled in the cavity between fully reflective mirror M1 and a partially reflective output coupler M2 The fibre was 10m long and pumped by a Nd:YAG laser 1 operating at 1.64 μm through a wavelength division multiplexer WDM1. The end mirror M1 was a 100% reflector butted to the $Pr^{3+}$ doped fibre 3. The output coupler M2 comprises either a ~92% reflecting mirror or an optically written fibre grating as will be described in more detail hereinafter.

In the embodiment of FIG. 3, the FM phase modulation is achieved in the silica fibre 2 To this end, modulating pulses from a 1.56 μm DFB laser 7 are coupled trough a wavelength division multiplexer WDM 2 into the silica fibre 2.

Figure 4A:
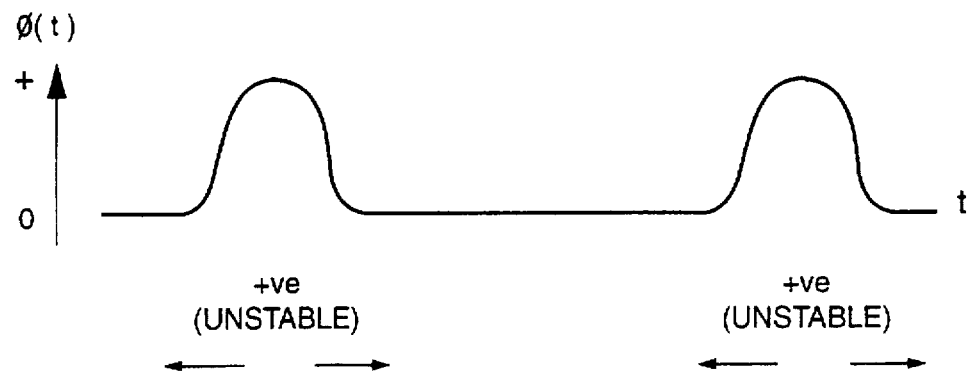
FIG. 4a illustrates the phase modulation produced in the apparatus of FIG. 3.

The modulating pulses produce changes in the refractive index of the silica fibre 2 via non linear (Kerr) effect; sometimes known as cross phase modulation (XPM), and by selecting the pulse repetition rate in accordance with the resonant frequency of the cavity, mode locking can be achieved. In practice, the pulses from the laser 7 have a duration of 35ps and are amplified in an erbium-doped fibre amplifier (not shown) to a maximum mean power of 30 mW. The pulse propagate along the of 500 m of the silica fibre 2 between the wavelength division multiplexers WDM 2 and WDM 3, and then exit from the cavity. The modulating pulses produce changes in the refractive index of the silica fibre so as to produce a positive going phase modulation of the $Pr^{3+}$ laser light that resonates in the cavity between the mirrors M1, M2. As a result, dark pulses are produced in the output of the laser, as will now be explained with reference to FIG. 4.

Figure 4B:
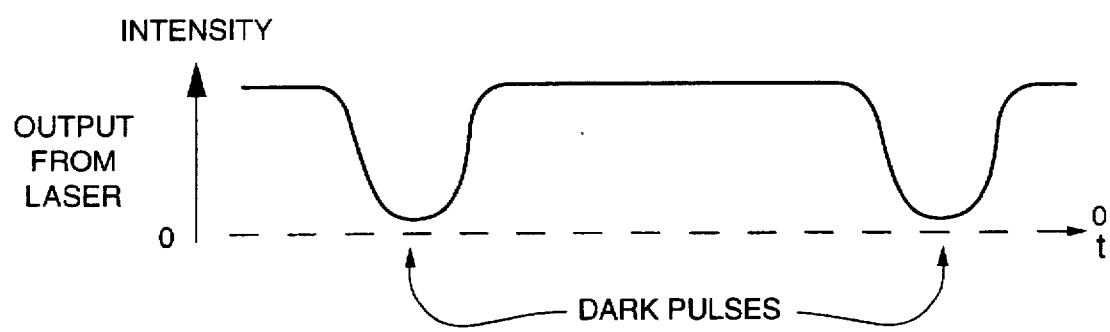
FIG. 4b illustrates schematically the output from the laser of FIG. 3.

In FIG. 41, the phase shift $\emptyset(t)$ produced by the modulating pulses in the silica fibre 2, is shown. It is to be noted that each successive modulation pulse produces the same positive phase window. The modulating fibre was chosen to have a dispersion zero at 1.44 μm such that the group delays at 1.3 μm (the resonant wavelength of the $Pr^{3+}$) laser and at 1.565 μm (the wavelength of the modulating pulses from DFB laser 7) were reasonably matched. The total dispersion for the laser cavity was estimated at 14 ps/m resulting from a 4 ps/nm and 10 ps/nm contributions from the Pr³⁺ fibre and the modulator fibre 3 a the modulator fibre 2 respectively. The resulting positive going chirp produced by the phase modulation shown in FIG. 4a, combines with the positive dispersion of the cavity to produce dark pulses as shown in FIG. 4b.

Figure 7A:
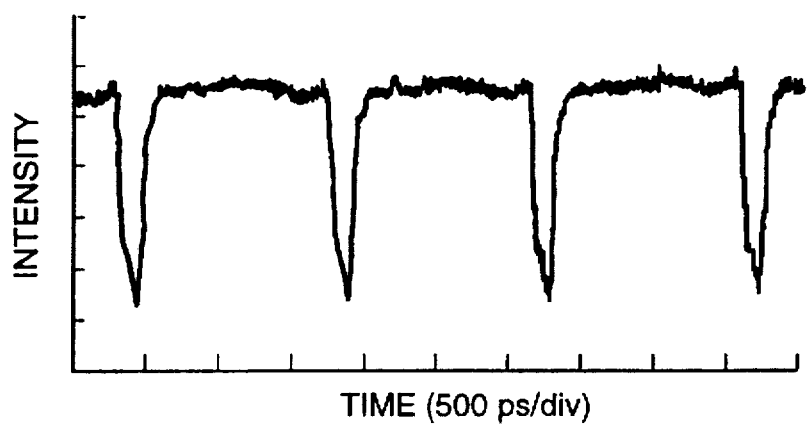
FIG. 7b illustrates corresponding results with the mirror, at 2.8 GHz.
FIG. 7c illustrates corresponding results when the mirror is replaced by the chirped grating, so as to provide bright output pulses.

FIG. 7a illustrates an example of output dark pulses produced when modulating pulses from the laser 7 are applied to fibre 2 with a repetition frequency of ~700 MHz. The combination of the positive frequency shifts produced by the modulating pulses from laser 7, and the normal dispersion of the cavity tends to "push" light of the modulation time slots into the unmodulated regions, giving rise to a broad, essentially continuous wave output, separated by dark optical pulses.

Figure 5:
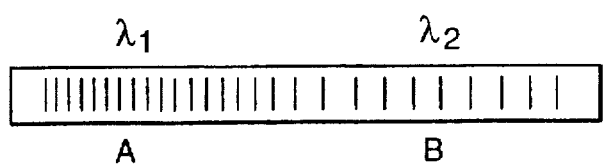
FIG. 5 is a is a schematic illustration of the stepped chirped grating that can be used in FIG. 3 to support bright pulses.
Figure 6:
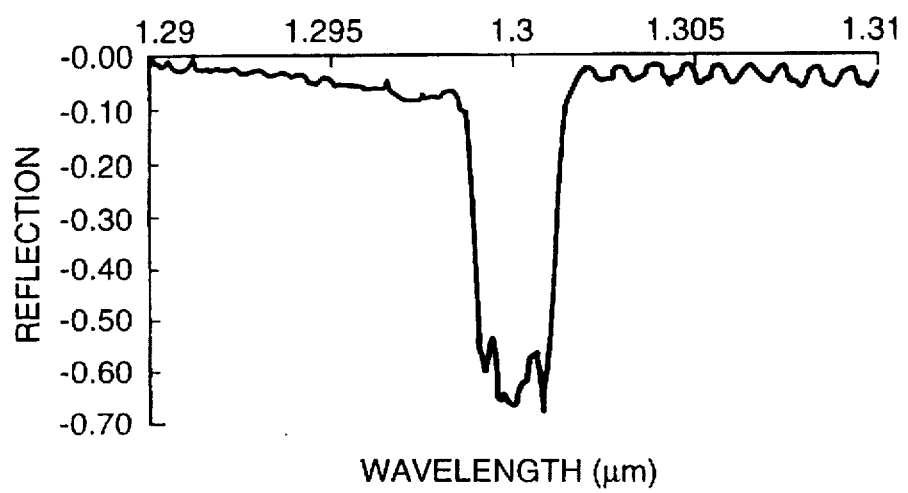
FIG. 6 illustrates the reflection of the characteristic of the chirp grating shown in FIG. 5, FIG. 7a dark pulses produced by the apparatus of FIG. 3 when a semi-reflective mirror is used as an output, at 700 HMz.

The apparatus shown in FIG. 3 additionally can be reconfigured to produce bright. This can be achieved by changing the cavity dispersion by replacing the mirror M2 by a so-called "chirped" grating. Such a grating may be produced as described in R. Kashyap et al: Novel method of producing all fibre photoinduced chirped gratings", Electronics letters, Vol 30, No. 12, pp. 996–998, 1994. Briefly, different gratings are produced by establishing standing wave in a photosensitive fibre to produce a grating pattern. The pattern is repeated in the fibre at different levels of applied stress so that, when the stress is released, of different spacings are recorded in the same fibre. A schematic illustration of a fibre including two such gratings is shown in FIG. 5, with its output characteristics being shown in FIG. 6. Referring to FIG. 5, the grating includes two spaced grating portions A, B, which exhibit peak reflectivities at $\lambda_1$ and $\lambda_2$ respectively. It can be seen that the spacing between the regions A, B will introduce a chirp into the pulses that resonate in the cavity, which by appropriate selection of the graticule spacings for regions A, B, result in a negative going dispersion, in order to compensate for the positive dispersion of the Pr³⁺ fibre 3.

Figure 7B:
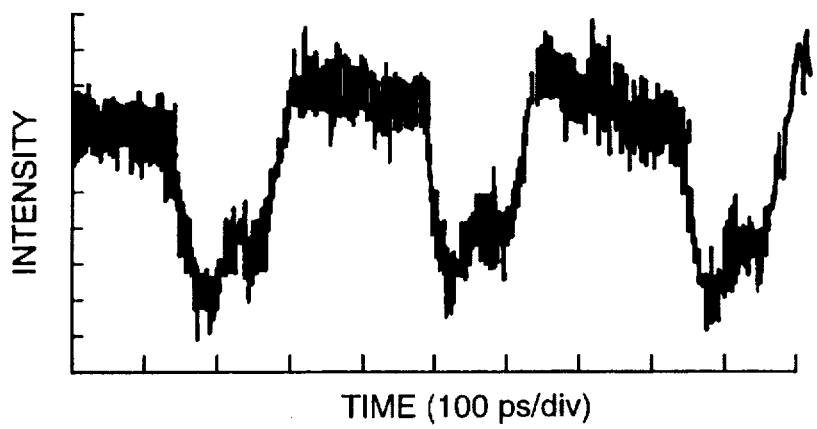
Figure 7C:
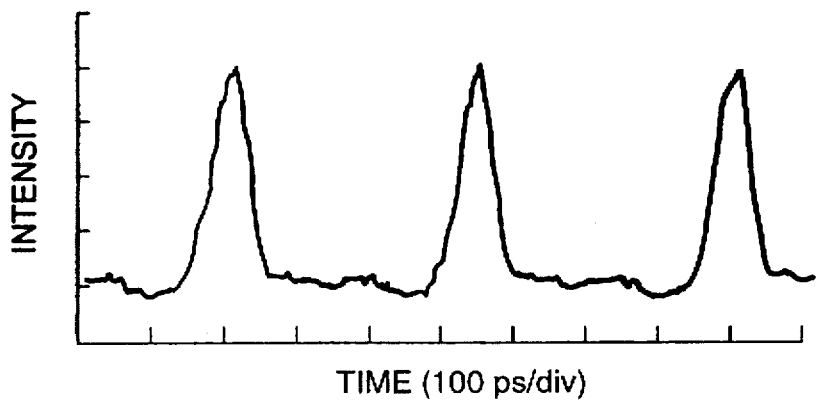

FIG. 7b and c show the laser output for the device of FIG. 3, where firstly the semi-reflecting mirror M2 is used (FIG. 7b) and when the mirror is replaced by the chirped (FIG. 7c). In both cases, modulating pulses from laser 7 were fed into the fibre 2 with a repetition rate of ~2.8 GHz. In absence of the grating as shown in FIG. 7b, dark pulses were produced and the results were qualitatively similar to those shown in FIG. 7a. However, when the grating was introduced, a net positive group delay was produced within the fibre, capable of supporting bright solitons and as a result, a stream of narrow ~50 ps bright optical pulses were produced.

Many modifications and variations of the described examples are possible. For example, it may be possible to replace the phase modulator by an amplitude modulator and achieve FM mode locking, and generate the dark pulses. In all of the described examples, the dark pulses may be solitons. As used herein, the term optical radiation includes visible light and non-visible radiation such as ultraviolet and infra-red radiation.

We claim:

1. An optical pulse generator comprising:

a resonant source of optical radiation (1, WDM1, 3, M1, M2);

a modulator (2);

a source of modulating signals (7);

said modulator being operative to mode lock said resonant source and phase modulate said optical radiation in accordance with the modulating signals in such a manner as to produce dark pulses in said optical radiation.

2. An optical pulse generator according to claim 1 wherein the radiation source comprises a laser (M1, 1, 3, M2).

3. An optical pulse generator according to claim 1 wherein the modulator includes a modulator optical fibre (2) connected in the cavity, and an optical modulating source (7) for directing optical modulating pulses into the modulating fibre to modulate the optical characteristics thereof.

4. An optical pulse generator according to claim 3 wherein the modulating optical fibre (2) comprises a silica fibre.

5. An optical pulse generator according to claim 1, additionally configurable to produce bright pulses.

6. An optical pulse generator according to claim 1 wherein the pulses are soliton pulses.

7. An optical pulse generator for generating dark pulses, comprising:

an optical cavity (M1, M2), an optically dispersive medium (3) within the cavity, means (1, 2, 3) for producing optical resonance within the cavity, and a modulator (2, 7) for cyclically modulating optical signals in the cavity for mode locking the resonance to produce pulses of a given periodicity, wherein the dispersive characteristics of the cavity and the modulating characteristics of the modulator are selected so as to produce dark output pulses.

8. An optical pulse generator according to claim 7 wherein the modulator (2, 7) is a phase modulator.

9. An optical pulse generator according to claim 7, including a pumping energy source (1), and means (WDM1) for coupling pumping energy from the source into the cavity.

10. An optical pulse generator according to claim 9 wherein the pumping energy source (1) comprises a Nd:YAG laser pump.

11. An optical pulse generator according to claim 7 wherein the optically dispersive medium within the cavity comprises an optical waveguide (3).

12. An optical pulse generator according to claim 11 wherein the optical waveguide comprises an optical fibre (3) doped to provide a particular wavelength dispersion characteristic.

13. An optical pulse generator according to claim 12 wherein the fibre is a praseodymium-doped fibre.

14. An optical pulse generator according to claim 7 wherein the cavity also includes dispersive means (M2) having a predetermined dispersion characteristic so that radiation resonant in the cavity is subject to wavelength dispersion as a function of the dispersion characteristics of both the waveguide (3) and the dispersive means (M2).

15. An optical pulse generator according to claim 14, wherein the dispersive means (M2) comprises a grating (A, B).

16. An optical pulse generator according to claim 15 wherein the grating has graticules with a spatial frequency that varies along the length thereof.

17. A method of generating optically dark pulses, comprising producing optical resonance within an optically dispersive cavity (M1, M2), and cyclically modulating optical signals in the cavity so as to mode lock the resonance and produce pulses of a given periodicity, the modulation being configured so as to produce dark output pulses.

* * * * *